US012786118B2

(12) United States Patent
Jiang et al.

(10) Patent No.: US 12,786,118 B2
(45) Date of Patent: Nov. 3, 2026

(54) MESSAGE ENCAPSULATION METHOD AND APPARATUS, MESSAGE TRANSMISSION METHOD AND APPARATUS, AND NETWORK NODE AND STORAGE MEDIUM

(71) Applicants: CHINA MOBILE COMMUNICATION CO., LTD RESEARCH INSTITUTE, Beijing (CN); CHINA MOBILE COMMUNICATIONS GROUP CO., LTD., Beijing (CN)

(72) Inventors: Wenying Jiang, Beijing (CN); Weiqiang Cheng, Beijing (CN); Yisong Liu, Beijing (CN)

(73) Assignees: CHINA MOBILE COMMUNICATION CO., LTD RESEARCH INSTITUTE, Beijing (CN); CHINA MOBILE COMMUNICATIONS GROUP CO., LTD., Beijing (CN)

( * ) Notice: Subject to any disclaimer, the term of this patent is extended or adjusted under 35 U.S.C. 154(b) by 162 days.

(21) Appl. No.: 18/849,065

(22) PCT Filed: Mar. 21, 2023

(86) PCT No.: PCT/CN2023/082771
§ 371 (c)(1),
(2) Date: Sep. 20, 2024

(87) PCT Pub. No.: WO2023/179606
PCT Pub. Date: Sep. 28, 2023

(65) Prior Publication Data
US 2025/0211525 A1 Jun. 26, 2025

(30) Foreign Application Priority Data
Mar. 24, 2022 (CN) ........................ 202210302639.X

(51) Int. Cl.
*G06F 15/173* (2006.01)
*G06F 15/16* (2006.01)
(Continued)

(52) U.S. Cl.
CPC .............. *H04L 45/74* (2013.01); *H04L 45/28* (2013.01); *H04L 45/34* (2013.01); *H04L 69/22* (2013.01)

(58) Field of Classification Search
CPC ....... H04L 45/74; H04L 45/741; H04L 45/28; H04L 45/34; H04L 69/22
(Continued)

(56) References Cited

U.S. PATENT DOCUMENTS

2015/0109902 A1* 4/2015 Kumar .................... H04L 45/28 370/219
2020/0162375 A1* 5/2020 Chen ........................ H04L 45/34
(Continued)

FOREIGN PATENT DOCUMENTS

CN 101160901 A 4/2008
CN 111682996 A 9/2020
(Continued)

OTHER PUBLICATIONS

Hu Huawei H Chen Futurewei H Chen China Telecom P Wu Huawei M Toy Verizon C Cao the China Unicom L Liu Fujitsu X Liu Volta Networ: "SRv6 Path Egress Protection; draft-hu-rtgwg-srv6-egress-protection-07.t xt", SRV6 Path Egress Protection; Draft-HU-RTGWG-SRV6-Egress-Protection-07.Txt; Internet-Drapt: Network Working Group, Feb. 22, 2020 (Feb. 22, 2020), pp. 1-15, XP015137862, the whole document.
(Continued)

*Primary Examiner* — Bharat Barot
(74) *Attorney, Agent, or Firm* — COOPER LEGAL GROUP LLC

(57) ABSTRACT

Provided in the present disclosure are a message encapsulation method and apparatus, a message transmission
(Continued)

method and apparatus, and a network node and a storage medium. The method comprises: a first node setting a first bit in a first message, and encapsulating a first SID in a message header of the first message, wherein the first node is an ingress node, the first bit is a reserved bit of the first message, and the first SID is an SID which is allocated by a first egress node to a user.

10 Claims, 5 Drawing Sheets

(51) Int. Cl.

| | |
|---|---|
| ***H04L 45/00*** | (2022.01) |
| ***H04L 45/28*** | (2022.01) |
| ***H04L 45/74*** | (2022.01) |
| ***H04L 69/22*** | (2022.01) |

(58) Field of Classification Search

USPC .................................. 709/238–239, 245–246

See application file for complete search history.

(56) References Cited

U.S. PATENT DOCUMENTS

| | | | | |
|---|---|---|---|---|
| 2021/0083973 | A1* | 3/2021 | Peng | H04L 45/74 |
| 2021/0092048 | A1 | 3/2021 | Dutta | |
| 2021/0243116 | A1* | 8/2021 | Filsfils | H04L 45/741 |
| 2021/0352012 | A1* | 11/2021 | Hu | H04L 45/34 |
| 2022/0094613 | A1* | 3/2022 | Wang | H04L 43/10 |
| 2022/0247682 | A1* | 8/2022 | Zhu | H04L 45/34 |
| 2023/0086279 | A1* | 3/2023 | Zhang | H04L 45/34 709/245 |

FOREIGN PATENT DOCUMENTS

| | | | |
|---|---|---|---|
| CN | 112787923 | A | 5/2021 |
| CN | 114124781 | A | 3/2022 |
| WO | 2021169258 | A1 | 9/2021 |
| WO | 2022222884 | A1 | 10/2022 |

OTHER PUBLICATIONS

Supplementary European Search Report in the European application No. 23773853.9, mailed on May 22, 2025, 12 pages.

International Search Report in the international application No. PCT/CN2023/082771, mailed on Jun. 26, 2023. 5 pages with English translation.

Written Opinion of the International Search Authority in the international application No. PCT/CN2023/082771, mailed on Jun. 26, 2023. 6 pages with English translation.

S. Previdi, et.al, "RFC 8754: IPV6 Segment Routing Header (SRH)"; Stream: Internet Engineering Task Force (IETF); Published: Mar. 1, 2020. pp. 1-27.

Zhibo Hu. et.al, "SRv6 Path Egress Protection draft-ietf-rtgwg-srv6-egress-protection-03"; Network Working Group, Internet-Draft, Intended status: Standards Track; May 28, 2021. pp. 1-18.

C. Li; Z. Hu; Huawei Technologies, "Enhanced Topology Independent Loop-free Alternate Fast Re-route draft-li-rtgwg-enhanced-ti-lfa-02", Aug. 3, 2020, pp. 1-9.

* cited by examiner

MESSAGE ENCAPSULATION METHOD AND APPARATUS, MESSAGE TRANSMISSION METHOD AND APPARATUS, AND NETWORK NODE AND STORAGE MEDIUM

CROSS-REFERENCE TO RELATED APPLICATIONS

The present application claims the priority of Chinese Patent Application No. 202210302639.X filed in China on Mar. 24, 2022, the contents of which is hereby incorporated by reference in its entirety.

TECHNICAL FIELD

The present disclosure relates to the technical field of networks, and in particular, to a message encapsulation method, message transmission method, message encapsulation apparatus, message transmission apparatus, a network node, and a storage medium.

BACKGROUND

The segment routing IPV6 (SRv6) policy based on the Internet Protocol version 6 (IPv6) is a source routing technology. When the SRv6 policy technology is used to provide a high-quality connection service for a user, a multi-homed connection service of dual provider edge (PE) devices or multiple PE devices is generally provided, and active/standby protection, that is, mirror protection, is formed between the PE devices. In the related art, mirror protection of an egress node or a tail node of SRv6 is implemented by extending a control plane protocol, and it is difficult to upgrade and modify existing network devices and implementation costs are high.

SUMMARY

In order to solve the related technical problems, embodiments of the present disclosure provide a message encapsulation and transmission method and apparatus, a network node, and a storage medium.

The technical solutions in the examples of the present disclosure are implemented as follows:

The embodiments of the present disclosure provide a message encapsulation method, applied to a first node, the first node being an ingress node, the method comprising:

setting a first bit in a first message, and encapsulating a first segment identify (SID) in a header of the first message, wherein the first bit represents a reserved bit in the first message, and the first SID is an SID allocated by a first egress node to a user.

In the above implementation, the first SID is encapsulated in an n-th position of a segment list of a segment routing header (SRH) of the first message, and the n-th position represents the last position of the segment list or a stack bottom position of the SRH.

In the above implementation, the method further comprises:

setting the value of a segments left (SL) field in the SRH to n−1.

In the above implementation, the first SID is encapsulated in a first Type Length Value (TLV) of a segment routing header (SRH) of the first message.

In the above implementation, the first egress node is a protection node for a second egress node.

In the above implementation, before the step of setting a first bit in a first message, and encapsulating a first SID in a header of the first message, the method further comprises:

determining that a second SID is configured with a backup first SID, wherein the second SID is an SID allocated by the second egress node to the user.

In the above implementation, before the step of setting a first bit in a first message, and encapsulating a first SID in a header of the first message, the method further comprises:

determining that a third SID is an SID of a penultimate segment popping (PSP) type, wherein the third SID is a penultimate hop SID in the segment list of the SRH.

The embodiments of the present disclosure further provide a message transmission method, applied to a second node, the second node being a penultimate hop node, the method comprising:

when it is discovered that a second SID is unreachable and a first bit of a first message is a specific value, changing a destination address of the first message to a first SID, wherein the first SID is carried in a header of the first message, the second SID is an SID allocated by a second egress node to a user, the first SID is an SID allocated by a first egress node to the user, and the first bit is a reserved bit in the first message.

In the above implementation, the first egress node is a protection node for the second egress node.

In the above implementation, the first SID being carried in a header of the first message comprises:

the first SID being carried in an n-th position of a segment list of an SRH of the first message, and the n-th position being the last position of the segment list or a stack bottom position of the SRH.

In the above implementation, the first SID being carried in a header of the first message comprises:

the first SID being carried in a TLV of an SRH of the first message.

The embodiments of the present disclosure further provide a message encapsulation apparatus, comprising:

an encapsulation unit, used to set a first bit in a first message, and encapsulate a first SID in a header of the first message, wherein the first bit is a reserved bit in the first message, and the first SID is an SID allocated by a first egress node to a user.

The embodiments of the present disclosure further provide a message transmission apparatus, comprising:

a changing unit, used to, when it is discovered that a second SID is unreachable and a first bit of a first message is a specific value, change a destination address of the first message to the first SID, wherein the first SID is carried in a header of the first message, the second SID is an SID allocated by a second egress node to a user, the first SID is an SID allocated by a first egress node to the user, and the first bit is a reserved bit in the first message.

The embodiments of the present disclosure further provide a first node, comprising: a first processor and a first communication interface, wherein the first processor is used to set a first bit in a first message, and encapsulate a first SID in a header of the first message, wherein the first bit is a reserved bit in the first message, and the first SID is an SID allocated by a first egress node to a user.

The embodiments of the present disclosure further provide a second node, comprising: a second processor and a second communication interface, wherein the second processor is used to, when it is discovered that a second SID is unreachable and a first bit of a first message is a specific value, change a destination address of the first message to the first SID, wherein the first SID is carried in a header of the first message, the second SID is an SID allocated by a second egress node to a user, the first SID is an SID allocated by a first egress node to the user, and the first bit is a reserved bit in the first message.

The embodiments of the present disclosure further provide a first node, comprising: a first processor and a first memory for storing a computer program executable by the processor, wherein when the first processor is used to run the computer program, the first processor performs the steps of the method according to any one on the first node side.

The embodiments of the present disclosure further provide a second node, comprising: a second processor and a second memory for storing a computer program executable by the processor, wherein when the second processor is used to run the computer program, the second processor performs the steps of the method according to any one on the second node side.

The embodiments of the present disclosure further provide a storage medium, having a computer program stored thereon, wherein when executed by a processor, the computer program implements the steps of the method according to any one on the first node side, or implements the steps of the method according to any one on the second node side.

In the message encapsulation and transmission method and apparatus, the network node, and the storage medium provided in the embodiments of the present disclosure, a first node serving as an ingress node sets a first bit in a first message, and encapsulates a first SID in a header of the first message. When it is discovered that a second SID is unreachable and the first bit of the first message is a specific value, a second node serving as a penultimate hop node changes a destination address of the first message to the first SID, wherein the second SID is an SID allocated by a second egress node to a user, the first SID is an SID allocated by a first egress node to the user, and the first bit is a reserved bit in the first message. In the above implementation, a reserved bit in an SRv6 message is used as a flag bit. The flag bit is set, and a first SID is encapsulated in a header, so that when an egress node of the SRv6 is faulty, an SID allocated by a protection node for the egress node to a user can be obtained from the SRv6 message by means of decapsulation. A destination address of the SRv6 message is changed on that basis, and traffic is forwarded to the protection node for the egress node, so that mirror protection of the egress node of the SRv6 is implemented in the data plane, and path switching protection of the SRv6 can be quickly completed in a multi-homing access scenario.

DETAILED DESCRIPTION

The SRv6 policy is a source routing technology. In the technology, an SRv6 extension header, i.e., an SRH, is introduced into an IPV6 message. An ordered segment list (segmentlist) is encapsulated in a head node to form an SRv6 path, for example, Segmentlist <SID1, SID2, . . . , SIDn>, to guide forwarding of an SRv6 message in a network along the specified path from SID1 to SIDn. The SRv6 path may be arranged by using a node SID (an SID of the END type) or a neighbor SID (an SID of the END.X type). When each hop in the SRv6 path uses the neighbor SID, the SRv6 path is a strict path, that is, each hop is specified. When some SIDs in the SRv6 path are node SIDs, the SRv6 path is a loose path, so that there may be different reachable links between two nodes.

When the SRv6 policy technology is used to provide a high-quality connection service for a user, a multi-homed connection service of dual PE devices or multiple PE devices is generally provided, and active/standby protection, that is, mirror protection, is formed between the PE devices. In a customer edge (CE) device dual-homing access scenario of a user site, if an egress node or a tail node of the SRv6 is faulty, service message loss occurs. In the related art, mirror protection of an egress node or a tail node of SRv6 is implemented by extending a control plane protocol, and it is difficult to upgrade and modify existing network devices and implementation costs are high.

On that basis, in various embodiments of the present disclosure, a first node serving as an ingress node sets a first bit in a first message, and encapsulates a first SID in a header of the first message. When it is discovered that a second SID is unreachable and the first bit of the first message is a specific value, a second node serving as the penultimate hop node changes a destination address of the first message to the first SID, wherein the second SID is an SID allocated by a second egress node to a user, the first SID is an SID allocated by a first egress node to the user, and the first bit is a reserved bit in the first message. In the above implementation, a reserved bit in an SRv6 message is used as a flag bit. The flag bit is set, and a first SID is encapsulated in a header, so that when an egress node (a second egress node) of the SRv6 is faulty, a backup SID (the first SID) allocated by a protection node for the egress node to a user can be obtained from the SRv6 message. A destination address of the SRv6 message is changed to the backup SID, and traffic is forwarded to the protection node (a first egress node) corresponding to the egress node, so that protection of the egress node of the SRv6 is implemented in the data plane, and path switching protection of a fault of the egress node of the SRv6 can be quickly completed in a multi-homing access scenario.

The present disclosure will be described in further detail below with reference to the accompanying drawings and embodiments.

Figure 1:
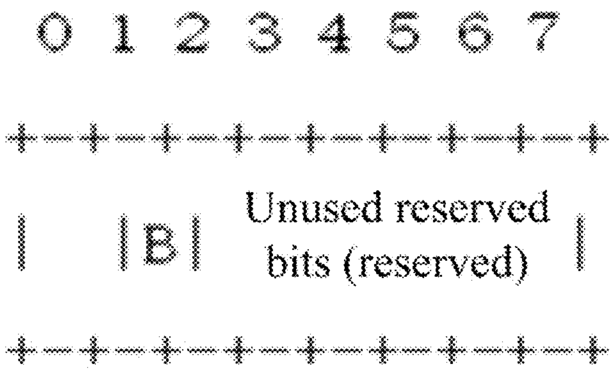
FIG. 1 is a schematic structural diagram of an extended flag bit of an SRv6 message according to an embodiment of the present disclosure.

First, the reserved bit of the SRv6 message in the embodiments of the present disclosure will be described. Here, the reserved bit of the SRv6 message is extended. In practical applications, the reserved bit may be located in a header of the SRv6 message, and may be, for example, a reserved bit in an SRH. FIG. 1 shows an exemplary structural diagram of an extended flag (Flag) field. One bit is occupied in the Flag field of the SRH to indicate whether protection switching processing of an egress node needs to be performed when a subsequent node is unreachable. Specifically:

B: a reserved bit in the Flag field. If the bit is set, that is, the bit is set to 1, it is indicated that protection switching processing of the egress node needs to be performed when a subsequent node is unreachable, and a backup SID is carried in the SRv6 message. Here, the backup SID represents an SID allocated by the protection node for the egress node to the user. In addition, in practical applications, the bit "B" may be any bit in the Flag field.

Reserved: an unused reserved bit. During transmission of the SRv6 message, the unused reserved bit must be 0, and when receiving the SRv6 message, a receiver ignores the unused reserved bit.

Figure 2:
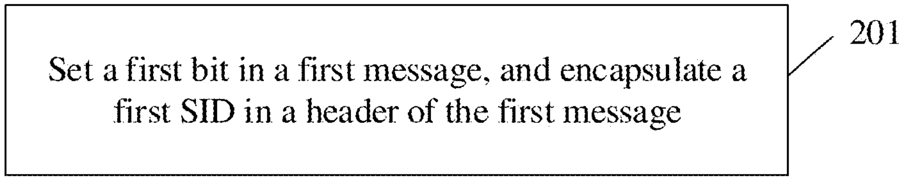
FIG. 2 is a schematic flowchart of a message encapsulation method according to an embodiment of the present disclosure.

On the basis of the structure of the flag bit extended for the SRv6 message, the embodiments of the present disclosure provide a message encapsulation method, applied to a first node, the first node being an ingress node. Here, the ingress node may be translated as "ingress", and may also be referred to as a head node, a source node, or the like, and in practical applications, the ingress node describes an ingress of a path or a tunnel. As shown in FIG. 2, the method includes:

Step 201: setting a first bit in a first message, and encapsulating a first SID in a header of the first message.

The first bit is a reserved bit in the first message. The first SID is an SID allocated by a first egress node to a user.

Here, the first message may be understood as an SRv6 message, and the first bit may be located in the header of the first message, for example, may be understood as the bit "B" in FIG. 1. A first node receives a message sent by a CE device, and sets the first bit when encapsulating an outer IPV6 header of the SRv6. Meanwhile, the first node encapsulates the first SID in the header of the SRv6 message. Here, the SID may be a service SID, and specifically may be a VPN SID. The setting the first bit means that the first bit is set to a specified value. In practical applications, the header in which the first bit is located may be the same as or different from the header in which the first SID is encapsulated.

Here, an egress node may also be referred to as a tail node or a sink node, and in practical applications, the egress node describes an egress of a path or a tunnel.

In an embodiment, before the step of setting a first bit in a first message, and encapsulating a first SID in a header of the first message, the method further includes:

determining that a second SID is configured with a backup first SID, wherein the second SID is an SID allocated by a second egress node to the user.

The second SID being configured with the backup first SID may also be understood as the second SID being configured with a protected first SID. In practical applications, the first SID may be referred to as a backup SID, and the second SID may be referred to as a primary SID. Here, the second egress node may be understood as a primary egress node or a currently active egress node of a path or a tunnel. The function of the first egress node is to perform protection when the second egress node is faulty. The first egress node may also be referred to as a backup node (backup egress) or a protection node for the second egress node.

That is, upon receiving the message sent by the CE device, the first node first performs a configuration query locally according to the primary SID of the CE user, and the first node encapsulates the outer IPV6 header of the SRv6 only if the primary SID is configured with the corresponding backup SID.

In an embodiment, before the step of setting a first bit in a first message, and encapsulating a first SID in a header of the first message, the method further includes:

determining that a third SID is an SID of a PSP type, wherein the third SID is a penultimate hop SID in a segment list of an SRH.

Here, in practical applications, according to the existing standard of SRv6, the penultimate hop SID in the segment list of the SRH represents the penultimate hop SID of an SRv6 path or tunnel, but when other extension is subsequently performed on the segment list, the position of the third SID in the segment list of the SRH may change, but the third SID still represents the penultimate hop SID of an SRv6 path or tunnel.

In an embodiment, the first SID is encapsulated in an n-th position of a segment list of an SRH of the first message, and the n-th position represents the last position of the segment list or a stack bottom position of the SRH.

The method further includes:

setting the value of an SL field in the SRH to n−1.

Here, the SL field is understood as a segment offset (segments left), and is also referred to as an SL pointer. In practical applications, the first SID is encapsulated in the last position (i.e., the n-th position of the SL) of the segment list of the SRH, and when encapsulation of the outer IPV6 message of the SRv6 is performed on the message, the value of the SL field in the SRH further needs to be set to n−1. Thus, normally, the SL pointer does not point to the first SID, but points to the SID in the (n−1)-th position.

In an embodiment, the first SID is encapsulated in a first TLV of the SRH of the first message.

The first TLV includes at least one of the following:

a type field, used to describe a type of the first TLV;

a length field, used to describe the length of the first SID; and a data field, used to carry the first SID.

Here, a TLV may be newly defined in the SRH, and the first SID may be carried in the data field of the TLV. The TLV is Type Length Value, and may represent type and length values.

Figure 3:
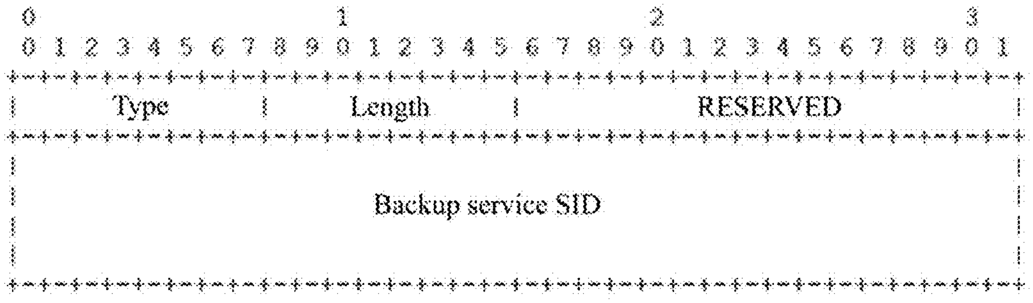
FIG. 3 is a schematic structural diagram of a first TLV according to an embodiment of the present disclosure.

FIG. 3 shows a structural diagram of a first TLV newly defined according to an embodiment of the present disclosure.

The field value of the type field is assigned by the Internet Assigned Numbers Authority (IANA). For example, the field value may be 10.

Figure 4:
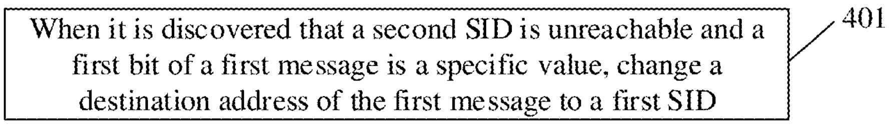
FIG. 4 is a schematic flowchart of a message transmission method according to an embodiment of the present disclosure.

The length field is used to describe the length of the first SID. For example, the field value of the length field indicates that the length of the first SID is 18 bytes. It should be noted that the length described by the field value of the length field does not include the length of the type field and the length of the length field itself in the first TLV. The first TLV further includes a reserved field (RESERVED) and a backup service SID field (Backup Service SID, which may occupy 128 bits). Backup Service SID Correspondingly, the embodiments of the present disclosure further provide a message transmission method, applied to a second node, the second node being a penultimate hop node. In practical applications, the penultimate hop node is a node corresponding to a penultimate hop SID in a segment list of an SRv6 path or tunnel. The penultimate hop SID may be an END type or an END.X type. As shown in FIG. 4, the method includes:

Step 401: when it is discovered that a second SID is unreachable and a first bit of a first message is a specific value, changing a destination address of the first message to a first SID.

The first SID is carried in a header of the first message. The second SID is an SID allocated by a second egress node to a user. The first SID is an SID allocated by a first egress node to the user. The first bit is a reserved bit in the first message.

The function of the first egress node is to perform protection when the second egress node is faulty. The first egress node may also be referred to as a backup node or a protection node for the second egress node.

Here, the first message may be understood as an SRv6 message. A first node sets the first bit in the first message, and the first SID is encapsulated in the header of the first message. When the SRv6 message is forwarded to a second node, the second node discovers that the next SID in the segment list in the SRH of the SRv6 message is unreachable, that is, the second egress node or the second tail node is unreachable, and then the second node reads the first SID from the corresponding position in the header of the SRv6 message according to an indication of the first bit, and changes the destination address of the SRv6 message to the first SID. In this way, the SRv6 message having the changed destination address will be sent to the first egress node.

As described above, the first node may encapsulate the first SID in the n-th position of the segment list of the SRH of the first message, or may encapsulate the first SID in the first TLV of the SRH of the first message. Therefore, on the basis of different encapsulation positions of the first SID, the second node correspondingly decapsulates the first SID by using different methods.

In an embodiment, the first SID being carried in a header of the first message includes:

the first SID being carried in an n-th position of a segment list of an SRH of the first message, and the n-th position being the last position of the segment list or a stack bottom position of the SRH.

In practical applications, the first node encapsulates the first SID in the last position of the segment list of the SRH, and when encapsulation of the outer IPV6 header of the SRv6 tunnel is performed on the message, the value of the SL field in the SRH further needs to be set to n−1. Thus, normally, the SL pointer does not point to the first SID, but points to the SID in the (n−1)-th position.

In an embodiment, the first SID being carried in a header of the first message includes:

the first SID being carried in a TLV of an SRH of the first message.

The first TLV includes at least one of the following:

a type field, used to describe a type of the first TLV;

a length field, used to describe the length of the first SID; and a data field, used to carry the first SID.

Here, when the second node discovers that the next SID in the segment list in the SRH of the SRv6 message is unreachable, that is, the second egress node is unreachable, the second node reads the first SID from the data field of the first TLV in the SRH of the SRv6 message according to an indication of the first bit.

Here, the penultimate hop SID of the SRv6 must be an SID of the PSP type to support popping of the SRH.

In the embodiments of the present disclosure, a reserved bit in an SRv6 message is used as a flag bit. The flag bit is set, and a first SID is encapsulated in a header, so that when an egress node of the SRv6 is faulty, a backup SID allocated by a protection node for the egress node to a user can be obtained from the SRv6 message. A destination address of the SRv6 message is changed to the backup SID, and traffic is forwarded to the protection node for the egress node, so that control plane protocol extension does not need to be performed, and protection of the egress node of the SRv6 is directly implemented in the data plane. In a multi-homing access scenario, the solution is easy to deploy, and path switching protection of a fault of a tail node of the SRv6 can be quickly completed.

The present disclosure will be described in further detail below with reference to application embodiments.

Figure 5:
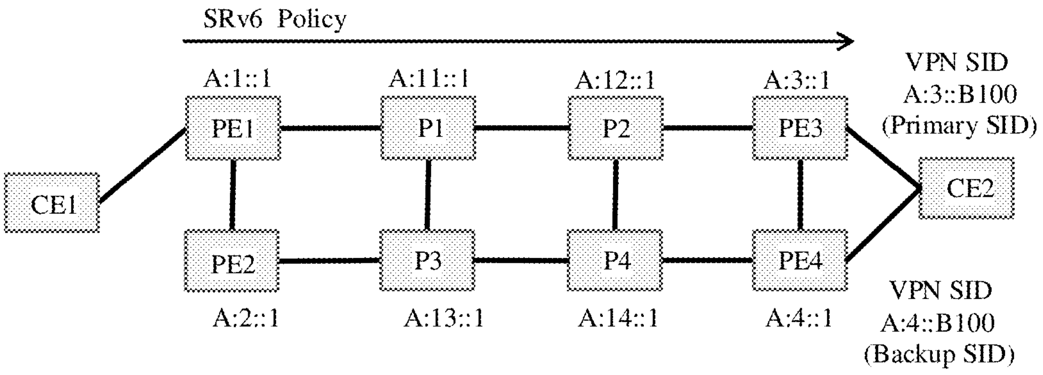
FIG. 5 is a schematic diagram of a network architecture according to an application embodiment of the present disclosure.

In the present application embodiment, a network includes routing devices such as PE1, PE2, PE3, PE4, P1, P2, P3, and P4. CE1 and CE2 are user-side devices, and a corresponding networking structure and SID allocation are shown in FIG. 5. PE1 is a head node (i.e., a first node) of an SRv6 path/tunnel, and may receive, via a control protocol, a primary VPN SID (i.e., a second SID) allocated to a user by a primary egress node (i.e., a second egress node) and a backup VPN SID (i.e., a first SID) allocated to the user by a backup egress node (i.e., a first egress node), or receive a VPN SID issued by a controller, or acquire the VPN SID by means of static configuration. A virtual private network (VPN) 1 user includes two sites CE1 and CE2, and PE3 and PE4 are dual-homing access devices of the site CE2. PE3 is a primary access device, and PE4 is a backup access device, so that a VPN SID allocated by PE3 to the VPN1 user is a primary SID, and a VPN SID allocated by PE4 to the VPN1 user is a backup SID. With reference to FIG. 5, the VPN SID "A:4::B100" is a backup SID of the VPN SID "A:3::B100", and a correspondence between "A:4::B100" and "A:3::B100" is present on PE1. Traffic from CE1 to CE2 is borne by an SRv6 policy path/tunnel, and corresponding path information is as follows:

segment list (segmentlist): <A:1::1, A:11::1, A:12::1, A:3::B100>

The penultimate hop SID (i.e., a third SID) "A:12::1" in the segment list is an SID of a penultimate segment popping (PSP) Flavor type.

In practical applications, PE1 receives a message sent by CE1, learns, according to the local correspondence between "A:4::B100" and "A:3::B100" when encapsulating an outer IPV6 header of the SRv6 tunnel, that the VPN1 user has a dual-homing protected egress node, meanwhile performs checking to determine that the penultimate hop SID "A:12::1" of segmentlist of the SRv6 is an SID of the PSP Flavor type, therefore sets SRH.B-Flag=1, and meanwhile encapsulates the backup SID "A:4::B100" in a corresponding position in the SRv6 message. The following encapsulation positions may be selected:

encapsulation position 1: "A:4::B100" is carried in the last position of segmentlist; and encapsulation position 2: "A:4::B100" is carried in an SRH TLV.

If the backup SID "A:4::B100" is carried in encapsulation position 1, the value of the current SL is set to the value of Last Entry minus 1, i.e. SL=n−1=3, so that the SL does not point to the backup SID, and only SID List [4] points to "A:4::B100". If "A:4::B100" is carried in encapsulation position 2, no additional processing is required.

Figure 6:
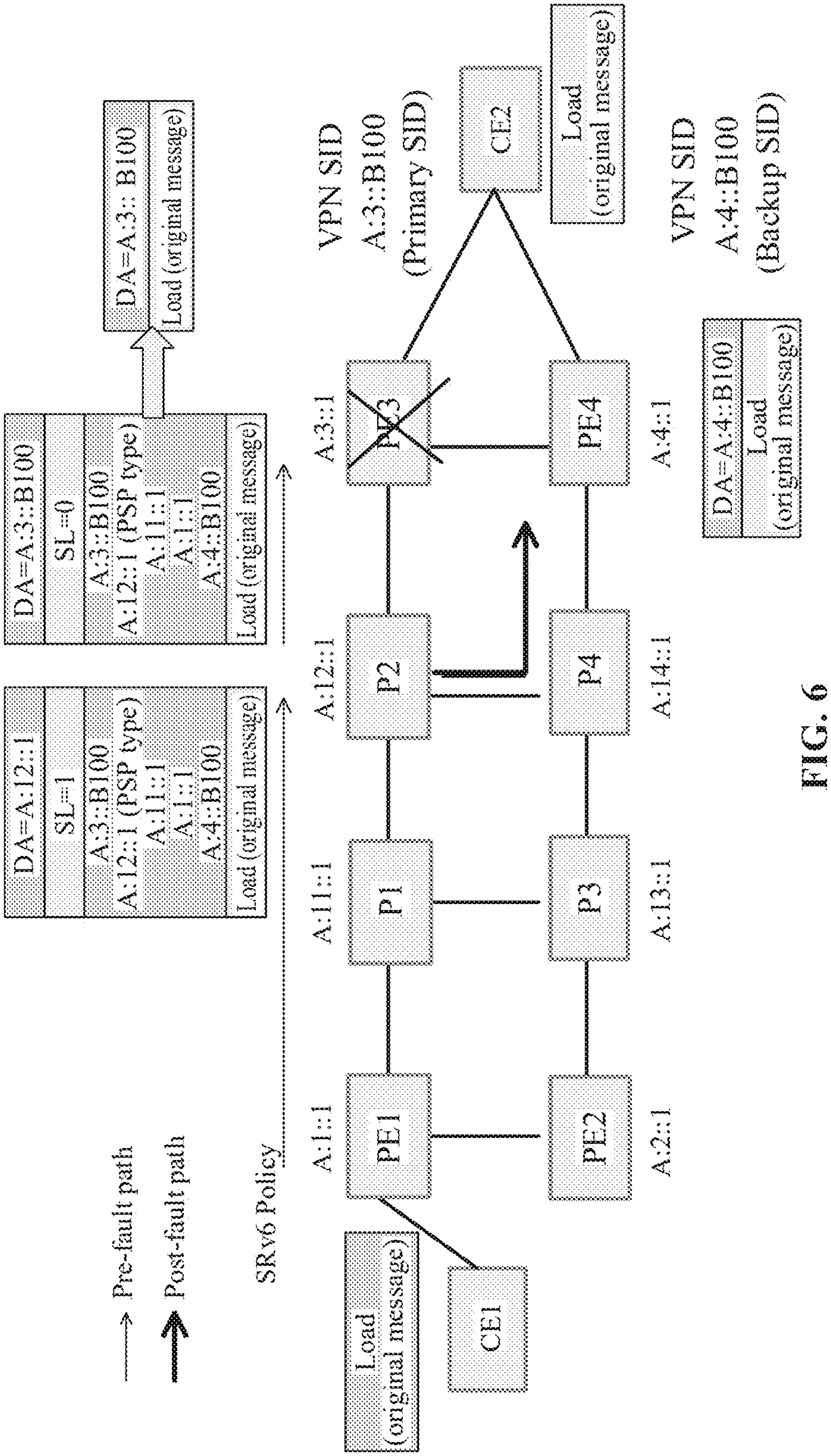
FIG. 6 is a schematic diagram of message forwarding according to an application embodiment of the present disclosure.

Referring to FIG. 6, when PE3 (a primary egress) is faulty, and when an SRv6 message reaches the penultimate hop node P2 (the second node) along the SRv6 path, P2 discovers that the next SID "A:3::B100" in segmentlist is unreachable, therefore obtains the backup SID "A:4::B100" from a corresponding position in the SRv6 message according to an indication of SRH.B-Flag-1, changes a destination address of the SRv6 message to backup "A:4::B100", and meanwhile pops the SRH according to the current SID being the PSP type Flavor. P2 continues to send the SRv6 message to PE4 (a backup egress) according to the new destination address "A:4::B100". When the SRv6 message reaches PE4, a corresponding action is performed according to the SID type of "A:4::B100". The outer IPV6 header is decapsulated. An inner original message is recovered. The original message is forwarded to CE2, thereby automatically implementing automatic protection switching when PE2 is faulty.

In addition, the method provided in the embodiments of the present invention further includes, as shown in FIG. 6, that after routing convergence is completed, the ingress node PE1 reselects a traffic forwarding path for the VPN1 user, to switch the path from CE1 to CE2 to the egress node PE4.

Figure 7:
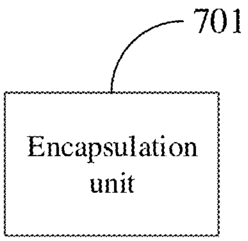
FIG. 7 is a schematic structural diagram of a message encapsulation apparatus according to an embodiment of the present disclosure.

In order to implement the method on the first node side of the embodiments of the present disclosure, the embodiments of the present disclosure further provide a message encapsulation apparatus provided on a first node. The first node is an ingress node. As shown in FIG. 7, the apparatus includes:

an encapsulation unit 701, used to set a first bit in a first message, and encapsulate a first SID in a header of the first message, wherein the first bit is a reserved bit in the first message, and the first SID is an SID allocated by a first egress node to a user.

In an embodiment, the first SID is encapsulated in an n-th position of a segment list of an SRH of the first message, and the n-th position represents the last position of the segment list or a stack bottom position of the SRH.

In an embodiment, the encapsulation unit 701 is further used to set the value of an SL field in the SRH to n−1.

In an embodiment, the first SID is encapsulated in a first TLV of the SRH of the first message.

In an embodiment, the first egress node is a protection node for a second egress node.

In an embodiment, the encapsulation unit 701 is further used to:

before setting the first bit in the first message, and encapsulating the first SID in the header of the first message, determine that a second SID is configured with a backup first SID, wherein the second SID is an SID allocated by the second egress node to the user.

In an embodiment, the encapsulation unit 701 is further used to:

before setting the first bit in the first message, and encapsulating the first SID in the header of the first message, determine that a third SID is an SID of a penultimate segment popping (PSP) type, wherein the third SID is a penultimate hop SID in the segment list of the SRH.

In practical applications, the encapsulation unit 701 may be implemented by a processor in the message encapsulation apparatus.

It should be noted that: for the message encapsulation apparatus provided in the above embodiments, when message encapsulation is performed, the division of the above program modules is merely used as an example for description. In practical applications, the above processing can be allocated to different program modules for completion according to needs, that is, the internal structure of the apparatus is divided into different program modules to accomplish all or part of the processing described above. In addition, the message encapsulation apparatus and message encapsulation method embodiments provided in the above embodiments belong to the same concept. For a specific implementation process of the apparatus, refer to the method embodiments for details, which will not be repeated herein.

Figure 8:
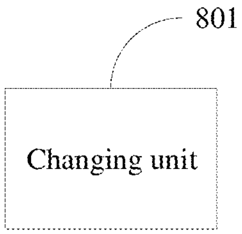
FIG. 8 is a schematic structural diagram of a message transmission apparatus according to an embodiment of the present disclosure.

In order to implement the method on the second node side of the embodiments of the present disclosure, the embodiments of the present disclosure further provide a message transmission apparatus provided on a second node. The second node is a penultimate hop node. In practical applications, the penultimate hop node is a node corresponding to the penultimate hop SID in the segment list of the SRv6 path or tunnel. The penultimate hop SID may be an END type or an END.X type. As shown in FIG. 8, the apparatus includes:

a changing unit 801, used to, when it is discovered that a second SID is unreachable and a first bit of a first message is a specific value, change a destination address of the first message to the first SID, wherein the first SID is carried in a header of the first message, the second SID is an SID allocated by a second egress node to a user, the first SID is an SID allocated by a first egress node to the user, and the first bit is a reserved bit in the first message.

In an embodiment, the first egress node is a protection node of the second egress node.

In an embodiment, the first SID being carried in a header of the first message includes:

the first SID being carried in an n-th position of a segment list of an SRH of the first message, and the n-th position being the last position of the segment list or a stack bottom position of the SRH.

In an embodiment, the first SID being carried in a header of the first message includes:

the first SID being carried in a TLV of an SRH of the first message.

In practical applications, the changing unit 801 may be implemented by a communication interface in the message transmission apparatus.

It should be noted that: for the message transmission apparatus provided in the above embodiments, when message transmission is performed, the division of the above program modules is merely used as an example for description. In practical applications, the above processing can be allocated to different program modules for completion according to needs, that is, the internal structure of the apparatus is divided into different program modules to accomplish all or part of the processing described above. In addition, the message transmission apparatus and message transmission method embodiments provided in the above embodiments belong to the same concept. For a specific implementation process of the apparatus, refer to the method embodiments for details, which will not be repeated herein.

Figure 9:
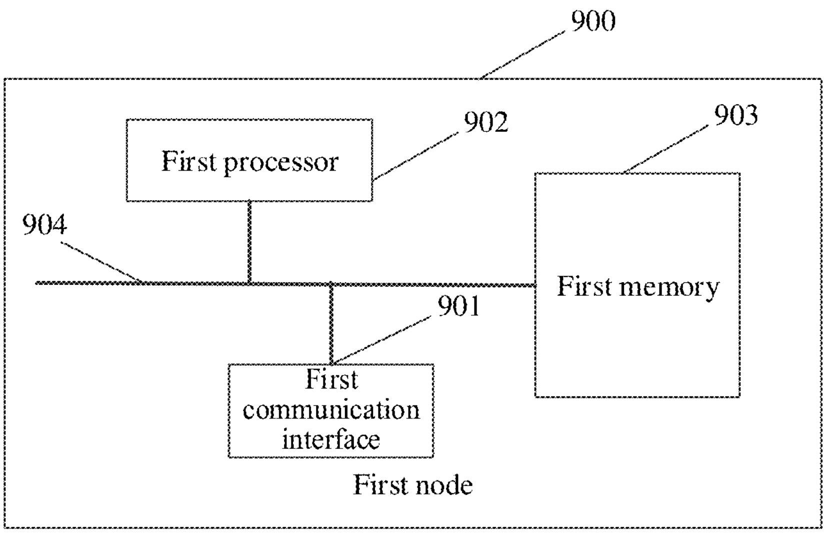
FIG. 9 is a schematic structural diagram of a first node according to an embodiment of the present disclosure.

On the basis of hardware implementation of the above program modules and in order to implement the method on the first node side of the embodiments of the present disclosure, the embodiments of the present disclosure further provide a first node. The first node represents a head node of the SRv6. As shown in FIG. 9, the first node 900 includes:

a first communication interface 901, capable of exchanging information with other network nodes; and a first processor 902, connected to the first communication interface 901 to exchange information with the other network nodes, and used to, when running a computer program, perform the method provided in one or more technical solutions on the first node side. The computer program is stored on a first memory 903.

Specifically, the first processor 902 is used to set a first bit in a first message, and encapsulate a first SID in a header of the first message, wherein the first bit is a reserved bit in the first message, and the first SID is an SID allocated by a first egress node to a user.

In an embodiment, the first SID is encapsulated in an n-th position of a segment list of an SRH of the first message, and the n-th position represents the last position of the segment list or a stack bottom position of the SRH.

In an embodiment, the first processor 902 is further used to set the value of an SL field in the SRH to n−1.

In an embodiment, the first SID is encapsulated in a first TLV of the SRH of the first message.

In an embodiment, the first egress node is a protection node for a second egress node.

In an embodiment, the first processor 902 is further used to:

before setting the first bit in the first message, and encapsulating the first SID in the header of the first message, determine that a second SID is configured with a backup first SID, wherein the second SID is an SID allocated by the second egress node to the user.

In an embodiment, the first processor 902 is further used to:

before setting the first bit in the first message, and encapsulating the first SID in the header of the first message, determine that a third SID is an SID of a penultimate segment popping (PSP) type, wherein the third SID is a penultimate hop SID in the segment list of the SRH.

It should be noted that: specific processing processes of the first processor 902 and the first communication interface 901 may be understood with reference to the above method.

Certainly, in practical applications, various assemblies in the first node 900 are coupled together by means of a bus system 904. It can be understood that the bus system 904 is used to implement the connection and communication between these assemblies. The bus system 904 includes, in addition to a data bus, a power supply bus, a control bus, and a status signal bus. However, for the sake of clear illustration, various buses are all designated as the bus system 904 in FIG. 9.

The first memory 903 in the embodiments of the present disclosure is used to store various types of data to support operations of the first node 900. Examples of the data include: any computer program operating on the first node 900.

The method disclosed in the embodiments of the present disclosure described above may be applied to the first processor 902, or implemented by the first processor 902. The first processor 902 may be an integrated circuit chip having a signal processing capability. During implementation, each step in the method described above may be completed by an integrated logic circuit of hardware in the first processor 902 or instructions in the form of software. The first processor 902 described above may be a general-purpose processor, a digital signal processor (DSP), or other programmable logic devices, a discrete gate or transistor logic device, a discrete hardware assembly, or the like. The various methods, steps, and logical block diagrams disclosed in the embodiments of the present disclosure may be implemented or executed by the first processor 902. The general-purpose processor may be a microprocessor, any conventional processor or the like. The steps of the methods disclosed with reference to the embodiments of the present disclosure may be directly embodied as hardware and executed and completed by a decoding processor, or executed and completed by a combination of hardware and software modules in the decoding processor. The software modules may be located in a storage medium. The storage medium is located in the first memory 903, and the first processor 902 reads the information in the first memory 903, and completes the steps of the aforementioned method in combination with its hardware.

In an exemplary embodiment, the first node 900 may be implemented by one or more application specific integrated circuits (ASICs), DSPs, programmable logic devices (PLDs), complex programmable logic devices (CPLDs), field-programmable gate arrays (FPGAs), general-purpose processors, controllers, micro controller units (MCUs), microprocessors, or other electronic components, and is used to perform the aforementioned method.

Figure 10:
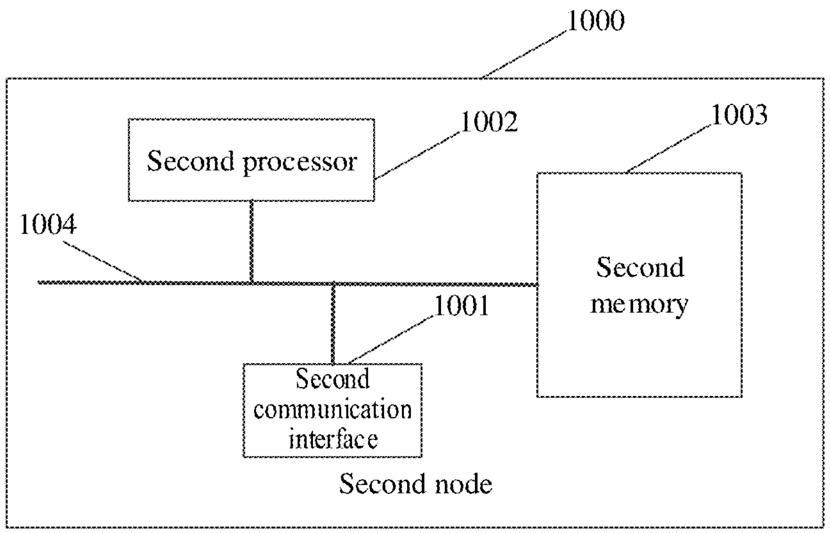
FIG. 10 is a schematic structural diagram of a second node according to an embodiment of the present disclosure.

On the basis of hardware implementation of the above program modules and in order to implement the method on the second node side of the embodiments of the present disclosure, the embodiments of the present disclosure further provide a second node. The second node represents the penultimate hop node of the SRv6. In practical applications, the penultimate hop node is a node corresponding to the penultimate hop SID in the segment list of the SRv6 path or tunnel. The penultimate hop SID may be an END type or an END.X type. As shown in FIG. 10, the second node 1000 includes:

a second communication interface 1001, capable of exchanging information with other network nodes; and a second processor 1002, connected to the second communication interface 1001 to exchange information with the other network nodes, and used to, when running a computer program, perform the method provided in one or more technical solutions on the second node side. The computer program is stored on a second memory 1003.

Specifically, the second processor 1002 is used to, when it is discovered that a second SID is unreachable and a first bit of a first message is a specific value, change a destination address of the first message to a first SID, wherein the first SID is carried in a header of the first message, the second SID is an SID allocated by a second egress node to a user, the first SID is an SID allocated by a first egress node to the user, and the first bit is a reserved bit in the first message.

In an embodiment, the first egress node is a protection node of the second egress node.

In an embodiment, the first SID being carried in a header of the first message includes:

the first SID being carried in an n-th position of a segment list of an SRH of the first message, and the n-th position being the last position of the segment list or a stack bottom position of the SRH.

In an embodiment, the first SID being carried in a header of the first message includes:

the first SID being carried in a TLV of an SRH of the first message.

It should be noted that: specific processing processes of the second processor 1002 and the second communication interface 1001 may be understood with reference to the above method.

Certainly, in practical applications, various assemblies in the second node 1000 are coupled together by means of a bus system 1004. It can be understood that the bus system 1004 is used to implement the connection and communication between these assemblies. The bus system 1004 includes, in addition to a data bus, a power supply bus, a control bus, and a status signal bus. However, for the sake of clear illustration, various buses are all designated as the bus system 1004 in FIG. 10.

The second memory 1003 in the embodiments of the present disclosure is used to store various types of data to support operations of the second node 1000. Examples of the data include: any computer program operating on the second node 1000.

The method disclosed in the embodiments of the present disclosure described above may be applied to the second processor 1002, or implemented by the second processor 1002. The second processor 1002 may be an integrated circuit chip having a signal processing capability. During implementation, each step in the method described above may be completed by an integrated logic circuit of hardware in the second processor 1002 or instructions in the form of software. The second processor 1002 described above may be a general-purpose processor, a DSP, or other programmable logic devices, a discrete gate or transistor logic device, a discrete hardware assembly, or the like. The various methods, steps, and logical block diagrams disclosed in the embodiments of the present disclosure may be implemented or executed by the second processor 1002. The general-purpose processor may be a microprocessor, any conventional processor or the like. The steps of the methods disclosed with reference to the embodiments of the present disclosure may be directly embodied as hardware and executed and completed by a decoding processor, or executed and completed by a combination of hardware and software modules in the decoding processor. The software modules may be located in a storage medium. The storage medium is located in the second memory 1003, and the second processor 1002 reads the information in the second memory 1003, and completes the steps of the aforementioned methods in combination with its hardware.

In an exemplary embodiment, the second node 1000 may be implemented by one or more ASICs, DSPs, PLDs, CPLDs, FPGAs, general-purpose processors, controllers, MCUs, microprocessors, or other electronic components, and is used to perform the aforementioned method.

It can be understood that the memories (the first memory 903 and the second memory 1003) of the embodiments of the present disclosure may be volatile memories or nonvolatile memories, or may include both volatile and nonvolatile memories. The nonvolatile memory may be a read only memory (ROM), a programmable read-only memory (PROM), an erasable programmable read-only memory (EPROM), an electrically erasable programmable read-only memory (EEPROM), a ferromagnetic random access memory (FRAM), a flash memory, a magnetic surface memory, a compact disc, or a compact disc read-only memory (CD-ROM). The magnetic surface memory may be a magnetic disk memory or a magnetic tape memory. The volatile memory may be a random access memory (RAM), which acts as an external cache. By way of example, but not by way of limitation, many forms of RAM may be used, for example, a static random access memory (SRAM), a synchronous static random access memory (SSRAM), a dynamic random access memory (DRAM), a synchronous dynamic random access memory (SDRAM), a double data rate synchronous dynamic random access memory (DDRSDRAM), an enhanced synchronous dynamic random access memory (ESDRAM), a SyncLink dynamic random access memory (SLDRAM), and a Direct Rambus random access memory (DRRAM). The memories described in the embodiments of the present disclosure are intended to include, but are not limited to, the aforementioned and any other suitable type of memory.

In an exemplary embodiment, the embodiments of the present disclosure further provide a storage medium, i.e., a computer storage medium, specifically a computer-readable storage medium, for example, including the first memory 903 storing a computer program, wherein the computer program may be executed by the first processor 902 of the first node 900, so as to complete the steps of the method on the first node side. As another example, the storage medium includes the second memory 1003 storing a computer program, wherein the computer program may be executed by the second processor 1002 of the second node 1000, so as to complete the steps of the method on the second node side. The computer-readable storage medium may be a memory such as a FRAM, a ROM, a PROM, an EPROM, an EEPROM, a flash memory, a magnetic surface memory, a compact disc, or a CD-ROM.

It should be noted that: "first," "second," and the like are used for distinguishing between similar objects and not necessarily for describing a particular sequential or chronological order.

In addition, the technical solutions recited in the embodiments of the present disclosure may be arbitrarily combined as long as they do not conflict with each other.

The foregoing are merely preferred embodiments of the present disclosure, and are not intended to limit the scope of protection of the present disclosure.

The invention claimed is:

1. A message encapsulation method, applied to a first node, the first node being an ingress node, the method comprising:

setting a first bit in a first message to 1 to indicate that protection switching processing of an egress node needs to be performed when a subsequent node is unreachable, and encapsulating a first Segment Identifier (SID) in a header of the first message, wherein the first bit is a reserved bit in a Flag field of a Segment Routing Header (SRH) of the first message, and the first SID is an SID allocated by a first egress node to a user, wherein the first SID is encapsulated in an n-th position of a segment list of the SRH of the first message, and the n-th position represents a last position of the segment list or a stack bottom position of the SRH, wherein the method further comprises:

setting a value of a Segments Left (SL) field in the SRH to n−1 to point to an SID in an (n−1)-th position.

2. The method of claim 1, wherein the first egress node is a protection node for a second egress node.

3. The method of claim 2, wherein before setting the first bit in the first message, and encapsulating the first SID in the header of the first message, the method further comprises:

determining that a second SID is configured with a backup first SID, wherein the second SID is an SID allocated by the second egress node to the user.

4. The method of claim 1, wherein before setting the first bit in the first message, and encapsulating the first SID in the header of the first message, the method further comprises:

determining that a third SID is an SID of a Penultimate Segment Popping (PSP) type, wherein the third SID is a penultimate hop SID in a segment list of a Segment Routing Header (SRH).

5. A first node, comprising: a processor and a memory for storing a computer program executable by the processor, wherein the processor is configured to: when running the computer program, perform operations of:

setting a first bit in a first message to 1 to indicate that protection switching processing of an egress node needs to be performed when a subsequent node is unreachable, and encapsulating a first Segment Identifier (SID) in a header of the first message, wherein the first bit is a reserved bit in a Flag field of a Segment Routing Header (SRH) of the first message, and the first SID is an SID allocated by a first egress node to a user, wherein the first SID is encapsulated in an n-th position of a segment list of the SRH of the first message, and the n-th position represents a last position of the segment list or a stack bottom position of the SRH, wherein the processor is further configured to: when running the computer program, perform an operation of:

setting a value of a Segments Left (SL) field in the SRH to n−1 to point to an SID in an (n−1)-th position.

6. The first node of claim 5, wherein the first egress node is a protection node for a second egress node.

7. The first node of claim 6, wherein the processor is further configured to: when running the computer program, perform:

before setting the first bit in the first message, and encapsulating the first SID in the header of the first message, determining that a second SID is configured with a backup first SID, wherein the second SID is an SID allocated by the second egress node to the user.

8. The first node of claim 5, wherein the processor is further configured to: when running the computer program, perform:

before setting the first bit in the first message, and encapsulating the first SID in the header of the first message, determining that a third SID is an SID of a Penultimate Segment Popping (PSP) type, wherein the third SID is a penultimate hop SID in a segment list of a Segment Routing Header (SRH).

9. A message transmission method, applied to a second node, the second node being a penultimate hop node, the method comprising:

when it is discovered that a second Segment Identifier (SID) is unreachable and a first bit of a first message is 1, changing a destination address of the first message to a first SID, wherein the first bit of the first message being 1 indicates that protection switching processing of an egress node needs to be performed when a subsequent node is unreachable, and the first SID is carried in a header of the first message, the second SID is an SID allocated by a second egress node to a user, the first SID is an SID allocated by a first egress node to the user, and the first bit is a reserved bit in a Flag field of a Segment Routing Header (SRH) of the first message, wherein the first SID being carried in a header of the first message comprises:

the first SID being carried in an n-th position of a segment list of the SRH of the first message, and the n-th position being a last position of the segment list or a stack bottom position of the SRH, wherein a value of a Segments Left (SL) field in the SRH is n−1 to point to an SID in an (n−1)-th position.

10. The method of claim 9, wherein the first egress node is a protection node for the second egress node.

* * * * *